United States Patent
Raghavendra et al.

(10) Patent No.: US 7,894,473 B2
(45) Date of Patent: Feb. 22, 2011

(54) SYSTEM AND METHOD FOR MONITORING VALVE STATUS AND PERFORMANCE IN A PROCESS CONTROL SYSTEM

(75) Inventors: Prasad T. S. Raghavendra, Bangalore (IN); Yu-Gene T. Chen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 600 days.

(21) Appl. No.: 11/402,593

(22) Filed: Apr. 12, 2006

(65) Prior Publication Data

US 2007/0242690 A1 Oct. 18, 2007

(51) Int. Cl.
H04J 3/16 (2006.01)

(52) U.S. Cl. .................. 370/465; 370/252; 370/338

(58) Field of Classification Search ......... 370/200–253, 370/272–309, 431–546, 338, 310, 370
See application file for complete search history.

(56) References Cited

U.S. PATENT DOCUMENTS

| | | | |
|---|---|---|---|
| 5,262,958 A | 11/1993 | Chui et al. | |
| 5,374,884 A | 12/1994 | Koren et al. | |
| 5,381,697 A | 1/1995 | van der Pol | |
| 5,594,180 A | 1/1997 | Carpenter et al. | |
| 5,641,891 A | 6/1997 | Frankl et al. | |
| 5,646,600 A | 7/1997 | Abdel-Malek et al. | |
| 5,721,477 A | 2/1998 | Sepehri et al. | |
| 5,724,655 A | 3/1998 | Grube et al. | |
| 5,750,879 A | 5/1998 | Ohtsuka et al. | |
| 5,966,674 A | 10/1999 | Crawford et al. | |
| 6,094,602 A | 7/2000 | Schade, III | |
| 6,138,810 A | 10/2000 | Fujii et al. | |
| 6,208,943 B1 | 3/2001 | Randolph et al. | |
| 6,229,448 B1 | 5/2001 | Bennett, Jr. et al. | |
| 6,236,334 B1 * | 5/2001 | Tapperson et al. | ..... 340/825.37 |
| 6,285,913 B1 | 9/2001 | Hagglund | |
| 6,286,532 B1 | 9/2001 | van Nieuwstadt et al. | |
| 6,408,676 B1 | 6/2002 | Stratton et al. | |

(Continued)

FOREIGN PATENT DOCUMENTS

EP 1 128 244 A2 8/2001

(Continued)

OTHER PUBLICATIONS

Fujun He et al. "WPT-SVMs Based Approach for Fault Detection of Valves in Reciprocating Pumps", Proceedings of the American Control Conference, Anchorage, AK, May 8-10, 2002, pp. 4566-4570.

(Continued)

*Primary Examiner*—Ricky Ngo
*Assistant Examiner*—Iqbal Zaidi
(74) *Attorney, Agent, or Firm*—Munck Carter, LLP

(57) ABSTRACT

A process control system includes at least one controller and at least one wireless valve element capable of being controlled by the at least one controller. The process control system also includes a first transceiver configured to communicate with the at least one wireless valve element and a second transceiver configured to communicate wirelessly with the first transceiver. The second transceiver is further configured to communicate with the at least one controller.

21 Claims, 3 Drawing Sheets

U.S. PATENT DOCUMENTS

| | | |
|---|---|---|
| 6,505,517 B1 | 1/2003 | Eryurek et al. |
| 6,517,029 B1 | 2/2003 | Holmes |
| 6,539,315 B1 | 3/2003 | Adams et al. |
| 6,654,697 B1 | 11/2003 | Eryurek et al. |
| 6,725,167 B2 | 4/2004 | Grumstrup et al. |
| 6,745,084 B2 | 6/2004 | Boger et al. |
| 6,967,589 B1 | 11/2005 | Peters |
| 7,111,817 B2 * | 9/2006 | Teti et al. ............... 251/129.04 |
| 7,274,995 B2 | 9/2007 | Zhan et al. |
| 7,286,945 B2 | 10/2007 | Zhan et al. |
| 7,647,940 B2 * | 1/2010 | Minervini et al. ........ 137/454.6 |
| 2001/0037670 A1 | 11/2001 | Boger et al. |
| 2001/0047383 A1 | 11/2001 | Dutta |
| 2002/0027504 A1 | 3/2002 | Davis et al. |
| 2002/0127447 A1 | 9/2002 | Edlund et al. |
| 2002/0156541 A1 | 10/2002 | Yutkowitz |
| 2003/0019297 A1 | 1/2003 | Fiebelkorn et al. |
| 2003/0066897 A1 * | 4/2003 | Carner et al. ................. 236/51 |
| 2003/0216888 A1 | 11/2003 | Ridolfo |
| 2004/0024568 A1 | 2/2004 | Eryurek et al. |
| 2004/0078168 A1 | 4/2004 | Horch |
| 2004/0231641 A1 | 11/2004 | Wind |
| 2005/0047330 A1 | 3/2005 | Tapperson et al. |
| 2005/0049727 A1 | 3/2005 | Tapperson et al. |
| 2005/0062677 A1 * | 3/2005 | Nixon et al. ................. 345/2.1 |
| 2005/0222691 A1 | 10/2005 | Glas et al. |
| 2007/0010900 A1 * | 1/2007 | Kavaklioglu et al. .......... 700/26 |
| 2007/0088446 A1 | 4/2007 | Srinivasan et al. |
| 2007/0139211 A1 * | 6/2007 | Pessin et al. ................. 340/679 |
| 2007/0171036 A1 | 7/2007 | Nordmeyer |
| 2007/0242629 A1 | 10/2007 | Morrison, Jr. et al. |
| 2007/0242690 A1 | 10/2007 | Raghavendra et al. |
| 2007/0288103 A1 | 12/2007 | Choudhury et al. |
| 2007/0289635 A1 * | 12/2007 | Ghazarian et al. ........... 137/312 |

FOREIGN PATENT DOCUMENTS

| | | |
|---|---|---|
| EP | 1202145 A1 | 5/2002 |
| WO | WO 01/35190 A2 | 5/2001 |
| WO | WO 2004/053604 A1 | 6/2004 |

OTHER PUBLICATIONS

Wang et al., "The Fault Character of the Motors Identified Based on Wavelet Transform", Nov. 2-5, 2003, Proceedings of the Second International Conference on Machine Learning and Cybernetics, Xi'an pp. 2394-2398.

Mallat et al., "Singularity Detection and Processing with Wavelets", Mar. 1992, IEEE Transactions on Information Theory, vol. 38, No. 2, pp. 617-643.

Simon G. Braun, "The Signature Analysis of Sonic Bearing Vibrations", IEEE Transactions on Sonics and Ultrasonics, vol. SU-27, No. 6, Nov. 1980, pp. 317-328.

Y. Gao et al., "Wavelet-Based Pressure Analysis for Hydraulic Pump Health Diagnosis", Transactions of the ASAE, vol. 46(4), pp. 969-976, 2003.

Horch A, "A Simple Method for Detection of Stiction In Control Valves", Control Engineering Practice, Pergamon Press, Oxford, GB, vol. 7, 1999, pp. 1221-1231.

Gao et al., Support Vector Machines Based Apprroach for Fault Diagnosis of Valves in Reciprocating Pumps, 2002 IEEE Canadian Conference, pp. 1622-1627.

Ren et al., Fault feature Extracting by Wavelet Transform for Control System Fault Detection and Diagnosis, 2000 IEEE, International Conference on Control Applications, pp. 485-489.

Wanlu et al., Applying MultiResolution Analysis for Processing of Hydraulic Pump Fault Signal, Mar. 18, 2003.

International Search Report dated Apr. 14, 2005 in connection with PCT Application No. PCT/US/2004/038766.

M.A.A. Shoukat Choudhury, "A Simple Test to Confirm Control Valve Stiction", IFAC World Congress, Jul. 4-8, 2005, Praha.

Yoshiyuki Yamashita, "An automatic method for detection of valve stiction in process control loops", Control Engineering Practice 14 (2006), p. 503-510.

Liyu Cao, et al., "Stick-slip Friction Compensation for PID Position Control", Proceedings of the American Control Conference, Chicago, IL., Jun. 2000, p. 1078-1082.

M.A.A. Shoukat Choudhury, et al., "A Data-Driven Model for Valve Stiction", ADCHEM 2003, Jan. 11-14, 2004, Hong Kong.

Alexander Horch, "A simple method for oscillation diagnosis in process control loops", Proceedings of the 1999 IEEE International Conference on Control Applications, Aug. 22-27, 1999, p. 1284-1289.

M.A.A. Shoukat Choudhury, et al., "Automatic detection and quantification of stiction in control valves", Control Engineering Practice 14 (2006), p. 1395-1412.

M.A.A. Shoukat Choudhury, et al., "Modeling Valve Stiction", Control Engineering Practice 2004, 46 pages.

Tore Hagglund, "A friction compensator for pheumatic control valves", Jounal of Process Control 12 (2002), p. 897-904.

H. Olsson, et al., "Friction Models and Friction Compensation", Nov. 28, 1997, 37 pages.

Ranganathan Srinivasan, et al., "Control Loop Performance Assessment. 1. A Qualitative Approach for Stiction Diagnosis", Ind. Eng. Chem. Res. 2005, 44, p. 6708-6718.

Ranganathan Srinivasan, et al., "Control Loop Performance Assessment. 2. Hammerstein Model Approach for Stiction Diagnosis", Ind. Eng. Chem. Res. 2005, 44, p. 6719-6728.

* cited by examiner

SYSTEM AND METHOD FOR MONITORING VALVE STATUS AND PERFORMANCE IN A PROCESS CONTROL SYSTEM

TECHNICAL FIELD

This disclosure relates generally to process control systems and more particularly to a system and method for monitoring valve status and performance in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Valves (whether control valves, rotary valves, or other types of valves) are often critical plant control elements, and they are one of the most common sources of disruptions during plant operations. Valve failures are often difficult to detect or predict because a large number of facilities do not have intelligent valve positioners. Instead, these facilities often use simple current-to-pressure converters (with or without external position sensors) or normal 4-20 mA based valve positioners (which are basically current-to-pressure converters and position sensors in one package).

SUMMARY

This disclosure provides a system and method for monitoring valve status and performance in a process control system.

In a first embodiment, an apparatus includes at least one wireless valve element, a first transceiver configured to communicate with the at least one wireless valve element, and a second transceiver configured to communicate wirelessly with the first transceiver. The second transceiver is also configured to communicate with a process control system.

In particular embodiments, the apparatus also includes at least one second wireless valve element and a third transceiver configured to communicate with the at least one second wireless valve element. The second transceiver is also configured to communicate wirelessly with the third transceiver.

In a second embodiment, a process control system includes at least one controller. The process control system also includes at least one wireless valve element capable of being controlled by the at least one controller. The process control system further includes a first transceiver configured to communicate with the at least one wireless valve element and a second transceiver configured to communicate wirelessly with the first transceiver. The second transceiver is further configured to communicate with the at least one controller.

In a third embodiment, a method includes receiving data from at least one wireless valve element at a first transceiver. The method also includes wirelessly communicating the data to a second transceiver and communicating the data from the second transceiver to a process control system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
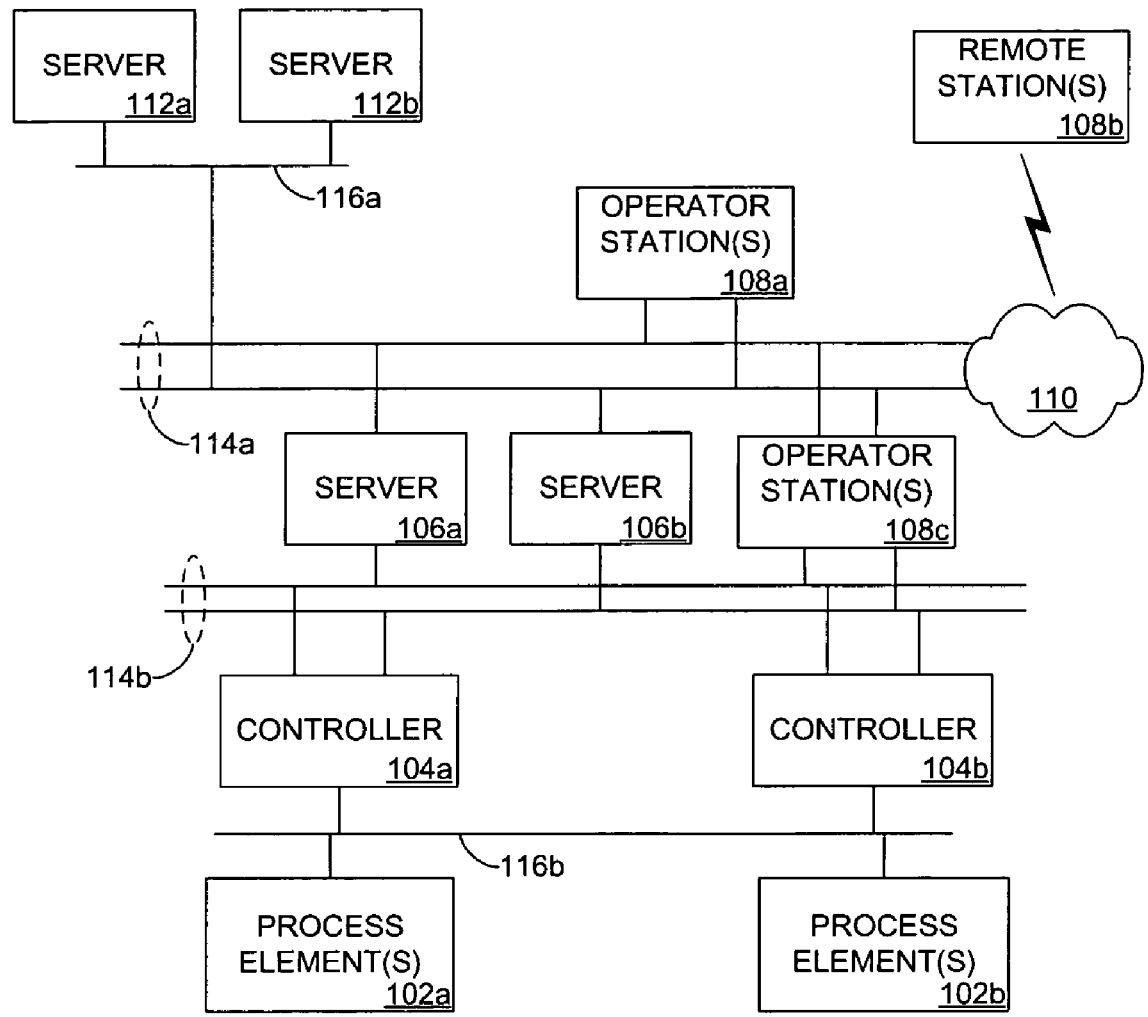
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system. While only two process elements 102a-102b are shown in this example, any number of process elements may be included in a particular implementation of the process control system 100.

Two controllers 104a-104b are coupled to the process elements 102a-102b. The controllers 104a-104b control the operation of the process elements 102a-102b. For example, the controllers 104a-104b could be capable of monitoring the operation of the process elements 102a-102b and providing control signals to the process elements 102a-102b. Each of the controllers 104a-104b includes any hardware, software, firmware, or combination thereof for controlling one or more of the process elements 102a-102b. The controllers 104a-104b could, for example, include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. The operator stations 108a-108c could, for example, represent personal computers having displays and processors executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 also includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116b represents any suitable network or combination of networks facilitating communication between components in the system 100. The networks 114a-114b, 116a-116b could, for example, represent Ethernet networks. The process control system 100 could have any other suitable network topology according to particular needs.

In one aspect of operation, one or more of the process elements 102a-102b may each include a wireless valve element, as described in more detail below with reference to FIG. 2. For example, in some embodiments, at least one of the process elements 102a-102b represents a valve (such as a control valve or other valve), which includes a wireless valve element that is capable of wirelessly controlling the valve. While only process element 102a is described below as including a wireless valve element, any number of process elements in the process control system 100 can include a wireless valve element. The wireless valve element of the process element allows effective and efficient valve monitoring and control. As examples, the wireless valve element may enable better control of the valve and provide additional information about the valve's health and status wirelessly to the process control system. Various embodiments provide the benefits of intelligent valve positioners with increased flexibility, lower cost, and lower risk.

Although FIG. 1 illustrates one example of a process control system 100, various changes may be made to is FIG. 1. For example, a control system could include any number of process elements, controllers, servers, and operator stations.

Figure 2:
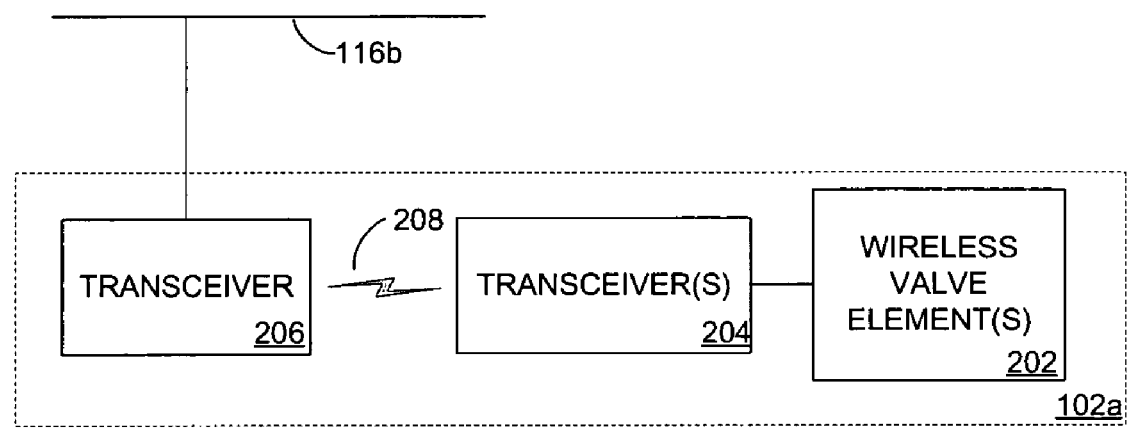
FIG. 2 illustrates an example process element including a wireless portion in a process control system according to one embodiment of this disclosure.

FIG. 2 illustrates an example process element 102a including a wireless valve element in a process control system 100 according to one embodiment of this disclosure. The process element 102a illustrated in FIG. 2 is for illustration only. Other process elements could be used in a process control system without departing from the scope of this disclosure. Also, for ease of explanation, the process element 102a shown in FIG. 2 is described with respect to the process control system 100 of FIG. 1. The process element 102a shown in FIG. 2 could be used with any other suitable device or system.

In this example, the process element 102a includes one or more wireless valve elements 202 and a wireless portion formed by two transceivers 204 and 206, which communicate by a wireless connection 208. Wireless valve element 202 includes any hardware, software, firmware, or combination thereof for performing one or more intelligent valve functions in a process or production system. In some embodiments, the wireless valve element 202 may be a conventional process valve that has been modified to communicate with transceiver 204 as described below. On other embodiments, existing valves in a plant can be retrofitted with wireless valve elements 202 as described herein.

The one or more wireless valve elements 202 are coupled to the transceiver 204. In some embodiments, a wireless valve element 202 is directly connected to the transceiver 204. In particular embodiments, the transceiver 204 is integrated with or into a wireless valve element 202. The transceiver 204 communicates over the wireless connection 208 with the transceiver 206, which in turn communicates over the network 116b. Depending on the implementation, the transceiver 204 may support uni-directional or bi-directional communication. For example, the transceiver 204 may be capable of transmission and not reception when no instructions or other data is to be sent to the wireless valve element 202. As used herein, valve control data can include any data sent to the wireless valve element 202 or transceiver 204 via transceiver 206, and valve status data can include any data sent by wireless valve element 202 or transceiver 204 to transceiver 206.

The wireless connection 208 can be implemented using any suitable wireless technology according to particular needs. Suitable wireless technologies may include, but are not limited to, analog and digital radio frequency (RF) signals, as well as particular protocols such as WiFi, Bluetooth, TDMA, CDMA, OFDMA, RFID, optical signaling, and others. The transceivers 204 and 206 can be implemented using any suitable transceiver technology consistent with the wireless technology required.

While the transceiver 204 may typically be located very close to the wireless valve element 202 or integrated with the wireless valve element 202, the transceiver 206 can be located as near or as far from the transceiver 204 as desired as long as the wireless connection 208 is reliable. In some implementations, the wireless valve element 202 and the transceiver 204 are battery-operated, and the transceiver 206 may be located as close as possible to the transceiver 204 in order to minimize transmission power consumption.

In some embodiments, the transceiver 206 is directly connected to the network 116b. In particular embodiments, the transceiver 206 is a dedicated transceiver or is implemented as part of a data processing system, a controller, or other device or system.

Wireless technology, coupled with advanced process control and optimization techniques, enables additional information about a valve to be provided to a controller or other device. This may provide better control fidelity without the high cost of installation associated with hardwired devices. It may also enable more efficient control of the valve and allow a greater ability to detect or predict valve failures.

In some embodiments, the process control system 100 is capable of receiving data from the wireless valve element 202 and other process elements and is able to aggregate the data from each wireless valve element 202. The process control system 100 can then use this data to determine an accurate indication of a valve's performance. According to the valve performance, the process control system 100 can determine if the valve can continue to be used, identify any valve performance deterioration, and determine if the valve requires maintenance. The valve performance deterioration may be further used by the process control system 100 to determine its actions and to auto-tune any associated processes to compensate for the deterioration. In addition, this information can be used by the process control system 100 or an asset management system to estimate or determine the exact point of valve failure and to identify appropriate preventive or corrective actions.

A wireless valve element 202 may provide significant advantages, such as the ability to wirelessly detect valve system failures as they occur. The failures that can be detected could include a stuck valve, slow movement of the valve, air pressure failures (such as low pressure or an obstructed pressure path), or other failures. A wireless valve element 202 can also enable the process control system 100 to identify deterioration in the valve's performance and to optimize valve maintenance. This may include specifically being able to monitor particular valve characteristics, such as total accumulated travel, percent deviation, and calculated stiction. The wireless valve element 202, in some embodiments, can combine position sensors and current-to-pressure converters with digital protocols like HART, Foundation Fieldbus, and Profibus to relay the valve characteristics back to the process control system 100. Is some embodiments, wireless valve element 202 and/or process control system 100 can also monitor diagnostics related to the controller 104a (or other controllers), process element 102a, and other elements with which it can communicate.

Although FIG. 2 illustrates one example of a process element 102a including a wireless valve element in a process control system 100, various changes may be made to FIG. 2. For example, the transceiver 204 could be integrated into the wireless valve element 202. Also, the transceiver 206 could be configured to connect with one or multiple transceivers 204, where each transceiver 204 is associated with one or more process elements 202. Wireless valve element 202 is capable of determining valve performance data or diagnostic data.

Figure 3:
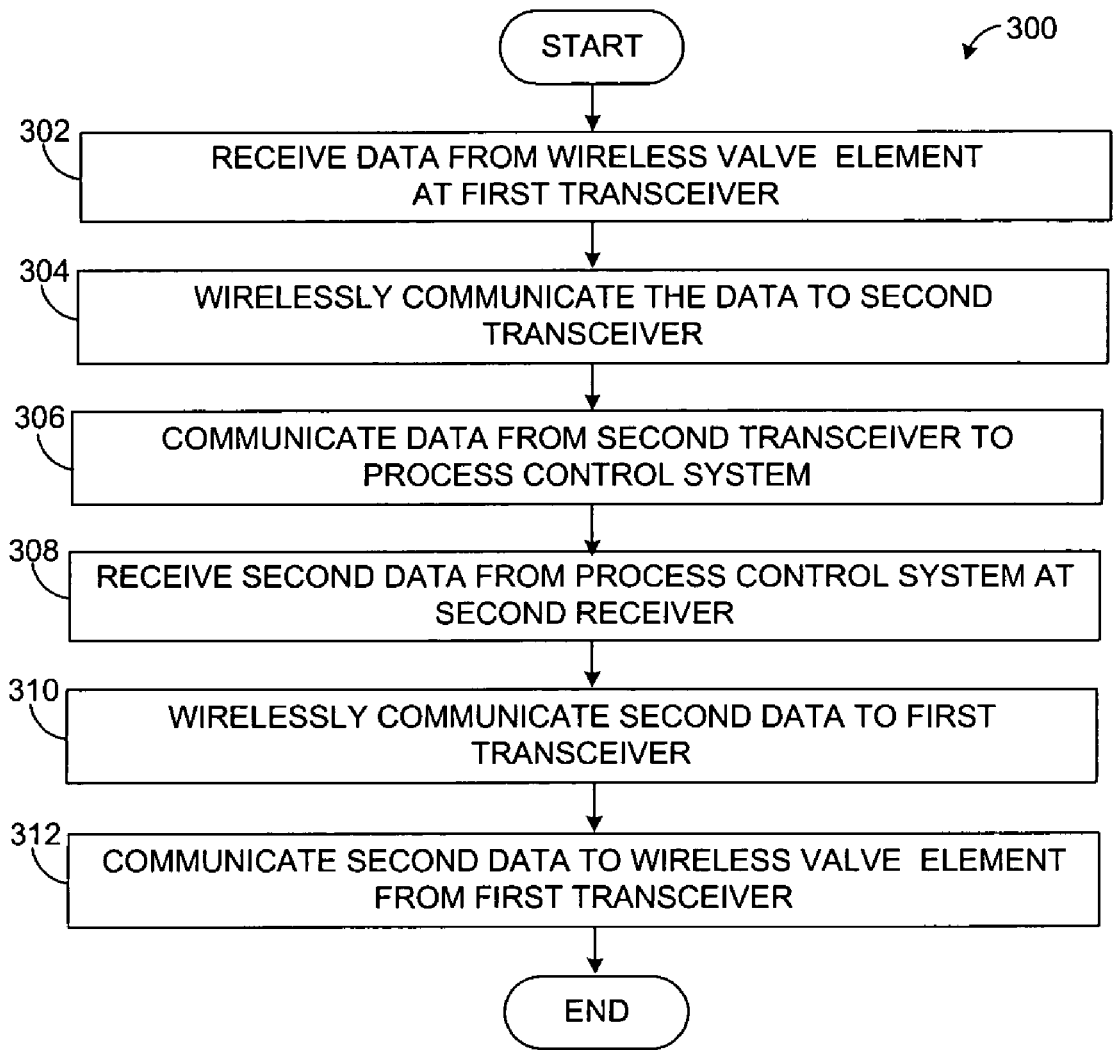
FIG. 3 illustrates an example method for process control using wireless devices according to one embodiment of this disclosure.

FIG. 3 illustrates an example method 300 for process control using wireless devices according to one embodiment of this disclosure. For ease of explanation, the method 300 is described with respect to the process element 102a of FIG. 2 operating in the process control system 100 of FIG. 1. The method 300 could be used by any other suitable device and in any other suitable system.

Data, which can include valve performance data or diagnostic data, is received from a wireless valve element 202 at a transceiver 204 at step 302. The data is wirelessly communicated to a transceiver 206 from the transceiver 204 at step 304. The data is communicated from the transceiver 206 to a process control system 100 (such as through network 116b) at step 306. At this point, the process control system 100 can take any suitable actions, such as analyzing the operation of a valve and identifying any problems with the valve.

Second data is received from the process control system 100 at the transceiver 206 at step 308. The second data is wirelessly communicated to the transceiver 204 from the transceiver 206 at step 310. The second data is communicated from the transceiver 204 to the wireless valve element 202 at step 312. In this way, the process control system 100 may, for example, provide control instructions to the wireless valve element 202 for controlling the operation of the valve.

Although FIG. 3 illustrates one example of a method 300 for using wireless communications for process elements, various changes may be made to FIG. 3. For example, one, some, or all of the steps may occur as many times as needed. Also, while shown as a sequence of steps, various steps in FIG. 3 could occur in parallel or in a different order.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   at least one wireless valve element;
   a first transceiver configured to communicate with the at least one wireless valve element and receive data from the at least one wireless valve element; and
   a second transceiver configured to communicate wirelessly with the first transceiver, the second transceiver further configured to communicate with a process control system and send data received from the first transceiver to the process control system;

wherein the process control system is configured to monitor a plurality of characteristics of the at least one wireless valve element, the characteristics including a total accumulated travel of each wireless valve element over a plurality of actuations of that wireless valve element and an amount of stiction in each wireless valve element; and wherein the process control system is also configured to aggregate data associated with the at least one wireless valve element, to identify a performance deterioration of the at least one wireless valve element, and to adjust control of a process based on the identified performance deterioration, wherein each wireless valve element is a process element of the process.

2. The apparatus of claim 1, wherein the process control system is configured to transmit valve control data to the at least one wireless valve element via a wireless connection between the first transceiver and the second transceiver.

3. The apparatus of claim 1, wherein the process control system is configured to receive valve status data from the at least one wireless valve element via a wireless connection between the first transceiver and the second transceiver.

4. The apparatus of claim 1, further comprising:
at least one second wireless valve element; and
a third transceiver configured to communicate with the at least one second wireless valve element, wherein the second transceiver is also configured to communicate wirelessly with the third transceiver.

5. The apparatus of claim 1, wherein the first transceiver is integrated into one of the at least one wireless valve element.

6. The apparatus of claim 1, wherein the at least one wireless valve element comprises a conventional process valve that has been modified to communicate with the first transceiver.

7. The apparatus of claim 1, wherein the at least one wireless valve element is configured to determine valve performance data or diagnostic data.

8. The apparatus of claim 1, wherein the second transceiver is configured to communicate with the first transceiver using one of: an analog radio frequency signal and a digital radio frequency signal.

9. The apparatus of claim 1, wherein multiple wireless valve elements are connected to the first transceiver.

10. A system, comprising:
a process control system comprising:
at least one controller;
at least one wireless valve element configured to be controlled by the at least one controller;
a first transceiver configured to communicate with the at least one wireless valve element and receive data from the at least one wireless valve element; and
a second transceiver configured to communicate wirelessly with the first transceiver, the second transceiver further configured to communicate with the at least one controller and send data received from the first transceiver to the process control system;
wherein the process control system is configured to monitor a plurality of characteristics of the at least one wireless valve element, the characteristics including a total accumulated travel of each wireless valve element over a plurality of actuations of that wireless valve element and an amount of stiction in each wireless valve element; and
wherein the process control system is also configured to aggregate data associated with the at least one wireless valve element, to identify a performance deterioration of the at least one wireless valve element, and to adjust control of a process based on the identified performance deterioration, wherein each wireless valve element is a process element of the process.

11. The system of claim 10, wherein the at least one controller is configured to transmit valve control data to the at least one wireless valve element via a wireless connection between the first transceiver and the second transceiver.

12. The system of claim 10, wherein the at least one controller is configured to receive valve status data from the at least one wireless valve element via a wireless connection between the first transceiver and the second transceiver.

13. The system of claim 10, further comprising:
at least one second wireless valve element; and
a third transceiver configured to communicate with the at least one second wireless valve element, wherein the second transceiver is also configured to communicate wirelessly with the third transceiver.

14. The system of claim 10, wherein the first transceiver is integrated into one of the at least one wireless valve element.

15. The system of claim 10, wherein the at least one wireless valve element comprises a conventional process valve that has been modified to communicate with the first transceiver.

16. The system of claim 10, wherein the at least one wireless valve element is configured to determine valve performance data or diagnostic data.

17. The system of claim 10, wherein the second transceiver is configured to communicate with the first transceiver using one of: an analog radio frequency signal and a digital radio frequency signal.

18. The system of claim 10, wherein multiple wireless valve elements are connected to the first transceiver.

19. A method, comprising:
receiving data from at least one wireless valve element at a first transceiver;
wirelessly communicating the data to a second transceiver;
communicating the data from the second transceiver to a process control system;
monitoring a plurality of characteristics of the at least one wireless valve element, the characteristics including a total accumulated travel of each wireless valve element over a plurality of actuations of that wireless valve element and an amount of stiction in each wireless valve element;
aggregating data associated with the at least one wireless valve element;
identifying a performance deterioration of the at least one wireless valve element; and
adjusting control of a process based on the identified performance deterioration, wherein each wireless valve element is a process element of the process.

20. The method of claim 19, further comprising:
receiving second data from the process control system at the second transceiver;
wirelessly communicating the second data to the first transceiver; and
communicating the second data from the first transceiver to the at least one wireless valve element.

21. The apparatus of claim 1, wherein the at least one wireless valve element comprises a position sensor and a current-to-pressure converter; and
wherein the at least one wireless valve element is configured to communicate using a digital protocol.

* * * * *